United States Patent [19]

Mundy

[11] 4,221,843
[45] Sep. 9, 1980

[54] CONSTRUCTION OF ELLIPTICAL METAL SUBSTRATES

[75] Inventor: Joseph Mundy, Malvern, Pa.

[73] Assignee: Matthey Bishop, Inc., Malvern, Pa.

[21] Appl. No.: 918,957

[22] Filed: Jun. 26, 1978

[51] Int. Cl.² .......................................... H04R 31/00
[52] U.S. Cl. .................................. 428/594; 428/592; 428/126; 428/128; 29/455 R
[58] Field of Search ............... 428/594, 592, 126, 128; 29/455

[56] References Cited

U.S. PATENT DOCUMENTS

| | | | |
|---|---|---|---|
| 2,392,989 | 1/1946 | Kliewer, Sr. | 181/56 |
| 3,086,625 | 4/1963 | Wyatt | 428/592 |
| 3,100,140 | 8/1963 | Ashley et al. | 23/288 |

*Primary Examiner*—Brooks H. Hunt
*Attorney, Agent, or Firm*—Cushman, Darby & Cushman

[57] ABSTRACT

A generally elliptical cylindrical metal substrate, and a method of construction thereof. A plate mandrel having a generally rectangular cross section is provided, and a first end of a web of metal substrate material is affixed to the plate mandrel. The metal substrate material preferably comprises alternate layers of planar metal foil and corrugated metal foil. As an alternative, a corrugated metal foil may be substituted for the planar foil. The metal substrate material web is wrapped around the mandrel, as by rotation of the mandrel while the web is fed off of a spool, until a substantially uniform thickness of metal substrate surrounding the mandrel is provided, a generally elliptical cylinder being formed. A second end of the web is affixed to a previous wrapping, thus forming a complete elliptical cylindrical metal substrate. The metal substrate is preferably catalyzed and used as a catalytic muffler or the like.

7 Claims, 4 Drawing Figures

CONSTRUCTION OF ELLIPTICAL METAL SUBSTRATES

BACKGROUND AND SUMMARY OF THE INVENTION

In the construction of metal substrates for catalytic converters, catalytic mufflers for automobiles, fume abatement activities in general, and the like, often times it is desired to provide a metal substrate that is elliptical in cross section. In the past, it has been extremely difficult to accurately and readily construct such elliptical cylindrical metal substrates (also called ovals or racetracks). However, it has been found, according to the present invention, that when particularly shaped and dimensioned mandrels are employed, elliptical cylindrical metal substrates may be easily fabricated.

The metal substrates according to the present invention are formed from "metal substate material". That term, as used in the present specification and claims, refers to material having a large amount of void volume. Conventionally, such material comprises a planar metal foil sheet with a corrugated foil sheet disposed thereon. The two sheets may be attached together or may be separate until being formed into the elliptical cylindrical metal substrate in which case they are wrapped together with a planar foil between each corrugated foil layer. While the term "metal substrate material" refers to a variety of materials with high void volume that are suitable for formation into an elliptical cylindrical metal substrate, alternating corrugated and planar foils is a suitable illustrative embodiment thereof. As an alternative to one planor and one corrugated foils, two sheets of corrugated foil can be wrapped together, providing their corrugations are aslant so as to prevent nesting, to form an elliptical cylindrical metal substrate.

According to the method of the present invention, generally elliptical cylindrical metal substrates having a major diameter D, a minor diameter d, and a depth H are formed by practicing the steps of: providing a plate mandrel having a generally rectangular cross section of length L and thickness T and having a depth approximately H; affixing a first end of a web of metal substrate material having a width H to a surface of the plate mandrel; wrapping the metal substrate material web around the mandrel until a substantially uniform thickness X is provided of metal substrates surrounding the mandrel to provide a generally elliptical cylinder with depth H; providing a second end of the metal substrate material web; and affixing the second end of the web to an underlying portion of the formed elliptical cylinder. The approximate dimensions L and T of the plate mandrel are determined before wrapping by using the equations $2X+L=D$ and $2X+T=d$. After calculation of the approximate dimensions, the optimum dimensions L and T are empirically determined, to take into account deformation of the metal substrate material that will occur at the edges of the plate mandrel during wrapping. Wrapping may be accomplished in a number of ways, but most suitably by affixing the plate mandrel to a rotating component, and rotating the mandrel with respect to a roll of metal substrate material to wind the material from the roll around the mandrel.

Also according to the present invention, a generally elliptical cylindrical metal substrate is provided having a major diameter D, minor diameter d, and depth H, comprising: a plate having a generally rectangular cross section of length L and thickness T and a depth H, located at the center of the substrate and extending between and terminating generally at the foci of the elliptical cylindrical metal substrate; a plurality of wrappings of metal substrate material disposed around the plate and having a substantially uniform thickness X; and means for maintaining the wrappings and plate integral. The plate is preferably made of high temperature oxidation resistant alloy and the wrappings of metal substrate material comprise alternate layers of planar metal foil and corrugated metal foil. Spot welds comprise the means for maintaining the wrappings and plate integral, affixing the first end of the metal substrate material wrappings to the plate and affixing a second end of the wrappings to a previous, interior wrapping.

It is the primary object of the present invention to provide a simple method for making acceptable elliptical cylindrical metal substrates, and to provide an elliptical cylindrical metal substrate that is suitable for catalyzing and functions well in fume abatement applications in general. This and other objects of the invention will become clear from an inspection of the detailed description of the invention, and from the appended claims.

DETAILED DESCRIPTION OF THE DRAWINGS

Figure 1:
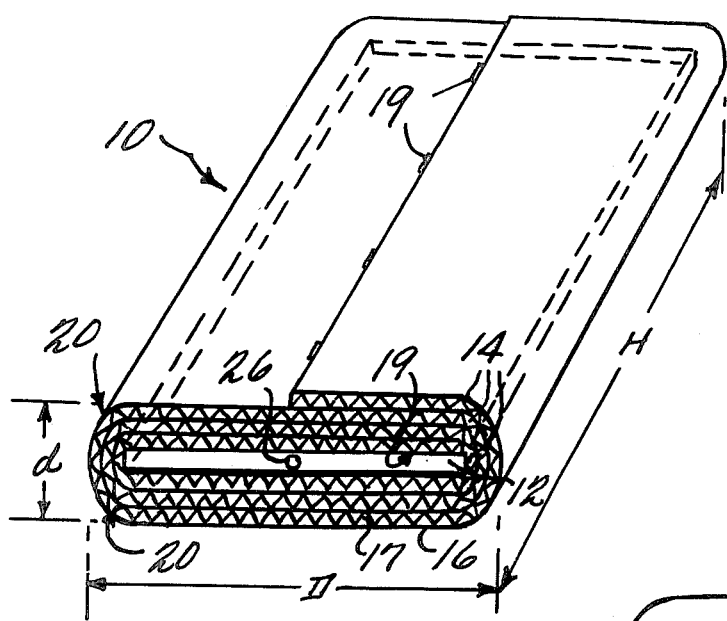
FIG. 1 is a perspective view of an exemplary elliptical cylindrical metal substrate according to the present invention.

A generally elliptical cylindrical metal substrate according to the present invention is shown in exemplary form at 10 in the drawings. The metal substrate 10 has a major diameter D, a minor diameter d, and a depth H. A plate 12 having a generally rectangular cross section of length L and thickness T, and having a depth approximately H, is located at the center of the substrate 10 and extends generally between and terminates substantially at the foci of the elliptical cylindrical metal substrate 10. The plate 12 is used for ease of construction of the substrate 10, and the dimensions of the plate 12 are such that it has a relatively small cross sectional area compared to the cross sectional area of the metal substrate 10 in general so as not to interfere with the function of the substrate 10 for fume abatement applications and the like (i.e. as a catalytic muffler).

Figure 2:
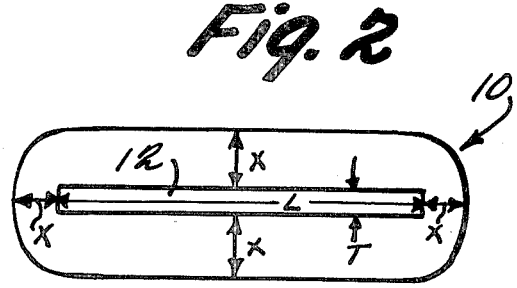
FIG. 2 is a schematic end view of the substate of FIG. 1, illustrating relevant dimensions that are determined for construction.

The metal substrate 10 further comprises a plurality of wrappings 14 of metal substrate material 15 disposed around the plate and having a substantially uniform thickness X (see FIG. 2) around the plate 12. Metal substrate material 15 comprises any suitable material having a large void volume and suitable for use in a metal substrate 10, for ultimate use in fume abatement applications and the like. An exemplary metal substrate material 15 is shown in FIGS. 1 and 2, and comprises a planar metal foil sheet 16 and a corrugated metal foil sheet 17. The sheets 16 and 17 may be permanently joined together at a plurality of points, or may originally be separate and wrapped together in alternate layers to form the wrappings 14 (i.e. see FIG. 3). For most fume abatement applications of the metal substrate 10, the plate 12 will be made from a high temperature oxidation resistant alloy, such as type 316 stainless steel or Inconel 600, because of the high temperatures (1300° to 1800° F.) that the metal substrate 10 is subjected to while in operation, and the metal substrate material 15 will also be made of materials suitable for such use.

The metal substrate 10 further comprises means, such as spot welds 19 (see FIGS. 1 and 3) for maintaining the wrappings 14 and plate 12 integral. While spot weldings 19 are suitable, obviously a wide variety of other affixing mechanisms may be employed.

According to the method of the present invention, the elliptical generally cylindrical metal substrate 10 is fabricated in a simple manner, yet the substrate 10 is very suitable for its intended uses, such simplification being possible because of the use of the particularly shaped plate 12 as a mandrel. According to the method of the invention, the plate mandrel 12 is provided having the generally rectangular cross section L and thickness T and depth of approximately H, and a first end of a web W of metal substrate material 15 having a width H is affixed to a surface of the plate mandrel 12 (see FIG. 3). Then the metal substrate material web W is wrapped around the mandrel 12 until a substantially uniform thickness X is provided of metal substrate surrounding the mandrel to provide a generally elliptical cylinder with depth H. Then a second end of the metal substrate material web W is provided, and the second end is affixed to an underlying portion of the formed elliptical cylinder, as shown at 19 in FIG. 1. The approximate dimensions L and T of plate mandrel 12 are determined before wrapping by using the equations: $2X+L=D$ and $2X+T=d$. The desired dimensions D and d are chosen, and then the approximate dimensions L and T may be calculated. However, because of deformation of the metal substrate material 15—i.e. elongation of the corrugations that occurs at the edges of the plate mandrel 12 during wrapping, as illustrated generally at 20 in FIG. 1—the optimum dimensions L and T are slightly modified from those determined by utilizing the above equations. After calculation of the approximate dimensions, the optimum dimensions L and T are empirically determined. For instance, for a 3.2 inch by 6.7 inch by 3 inch long racetrack metal substrate 10: $2X+L=6.7$ inches; $2X+T=3.2$ inches; choosing T as 0.125 inch thick (which ensures no substantial hindrance of the substrate 10 for end use in fume abatement applications and the like), and solving for L, one gets: $6.7-L=3.2-0.125$; or $L=3.625$. Therefore, one would expect a mandrel 12 of 3.625 inches by 0.125 inches by 3 inches (H) is required. However, because of elongation of the corrugations of sheet 17 during wrapping, working empirically from the approximate calculations, it has been found that a $0.250=T$ by $4.000=L$ mandrel 12 is optimum for making a 3.2 inch by 6.7 inch racetrack.

Figure 3:
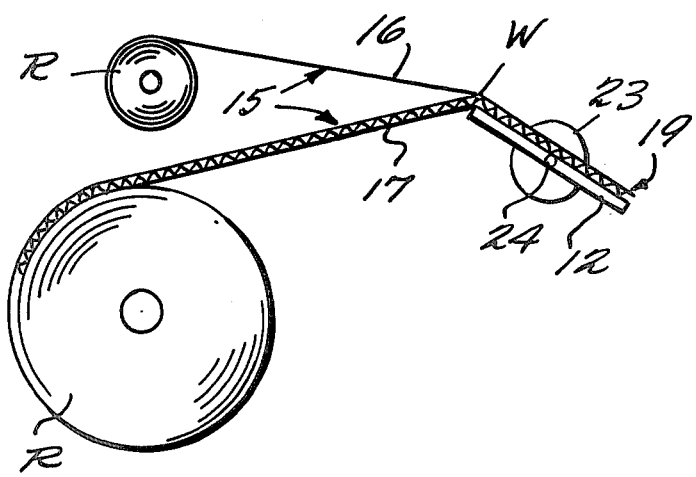
FIG. 3 is a side schematic view illustrating an exemplary method of construction of the substrate of FIG. 1.
Figure 4:
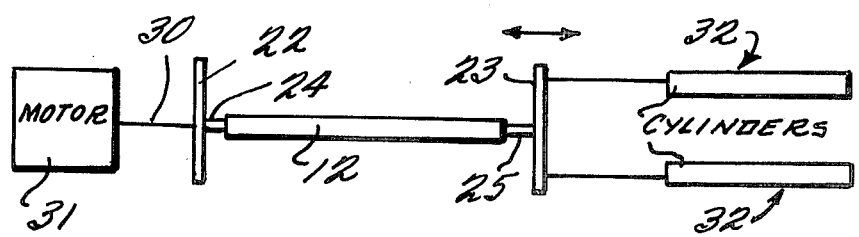
FIG. 4 is a top schematic view of exemplary mandrel rotation apparatus with a mandrel in place.

With particular reference to FIGS. 3 and 4, it is preferable to practice the wrapping step of the method according to the invention by rotating the mandrel 12 while feeding the metal substrate material 15 off of one or more rolls R (depending upon the exact configuration of the metal substrate material 15). Exemplary apparatus for rotating the mandrel 12 preferably includes a pair of spaced discs 22, 23, having projections 24, 25, respectively extending from the middle thereof. The projection 24 is keyed into an orifice 26 (see FIG. 1) provided in one end of the plate 12, while the other projection 25 merely provides a pivot point for rotation of the mandrel 12 about a fixed axis defined by the projections 24, 25. The disc 22 is connected up, as by shaft 30, to a rotary motor 31 or the like, rotation of shaft 30 by motor 31 resulting in the transmission of the rotary force through the disc 22 and projection 24 to rotate the plate 12 about an axis extending through projections 24 and 25. To remove the mandrel 12 from the rotating assembly, preferably a hydraulic cylinder arrangement 32, or the equivalent, is provided operatively connected to the disc 23 for longitudinally moving the disc 23 along the axis defined by projections 24 and 25 to detach the mandrel 12 from the projections 24 and 25.

In practicing the method according to the invention, preferably the affixing steps are accomplished by spot welding, as by spot welding a first end of the web W to a surface of the plate 12 (shown at 19 in FIG. 3), and then by spot welding a second end of the web W to an underlying portion of the elliptical cylinder (as shown at 19 in FIG. 1). The web W may be constructed to be of exactly the size desired for the construction of a single metal substrate 10, or the web W may merely be severed after a given number of rotations of the mandrel 12, severing of the web W providing the second free end of the substrate 10 that is completing formation, and the first free end of the next substrate 10 to be formed.

After formation of the metal substrate 10, it preferably is catalyzed, at which point is it suitable for use in fume abatement applications, such as a catalytic muffler for an automobile. Other accessory structures also can be provided with the substrate 10 depending upon the exact desired end function thereof.

It will thus be seen that according to the present invention a method of forming a metal substrate has been provided which effects extremely simple and sure formation of the substrate. Also according to the present invention, a metal substrate has been provided which is simple to form yet is eminently suitable for a wide variety of fume abatement applications and the like, where generally elliptical cylindrical metal substrates are desired.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A generally elliptical cylindrical metal substrate having a major diameter D, minor diameter d, and depth H, comprising a plate having a generally rectangular cross section of length L and thickness T, and a depth approximately H, located at the center of said substrate and extending between and terminating substantially at the foci of said elliptical cylindrical metal substrate, a plurality of wrappings of metal substrate material disposed around said plate and having a substantially uniform thickness X, and means for maintaining said wrappings and plate integral.

2. A metal substrate as recited in claim 1 wherein the plate has the approximate dimensions L and T determined by the equations $$2X+L=D \text{ and } 2X+T=d,$$

wherein D and d are chosen as desired.

3. A metal substrate as recited in claim 2 wherein the exact dimensions L and T differ from the approximate dimensions in that they take into account deformation of the metal substrate material at the plate edges.

4. A metal substrate as recited in claim 1 wherein said wrappings of metal substrate material comprise alternate layers of planar metal foil and corrugated metal foil.

5. A metal substrate as recited in claim 1 wherein said plate is a high temperature oxidation resistant alloy.

6. A metal substrate as recited in claim 5 wherein the high temperature oxidation resistant alloy is selected from the group consisting essentially of 316 stainless steel and Inconel 600.

7. A metal substrate as recited in claim 1 wherein said means for maintaining said wrappings and plate integral comprise means for affixing a first end of said metal substrate material wrappings to said plate and for affixing a second end of said wrappings to a previous wrapping.

* * * * *